(12) United States Patent
Ishijima

(10) Patent No.: US 6,903,921 B2
(45) Date of Patent: Jun. 7, 2005

(54) CHIP-TYPE SOLID ELECTROLYTIC CAPACITOR SUPERIOR IN PRODUCTIVITY AND RELIABILITY THEREOF

(75) Inventor: Masami Ishijima, Toyama (JP)

(73) Assignees: NEC Tokin Corporation, Sendai (JP); NEC Tokin Toyama, Ltd., Shimonikawa-gun (JP)

(*) Notice: Subject to any disclaimer, the term of this patent is extended or adjusted under 35 U.S.C. 154(b) by 0 days.

(21) Appl. No.: 10/881,823

(22) Filed: Jun. 29, 2004

(65) Prior Publication Data

US 2005/0002148 A1 Jan. 6, 2005

(30) Foreign Application Priority Data

Jul. 4, 2003 (JP) .......................................... 2003-270914

(51) Int. Cl.[7] .................................................. H01G 9/00
(52) U.S. Cl. ........................ 361/523; 361/531; 361/540; 29/25.03
(58) Field of Search ................................ 361/523, 531, 361/533, 535, 540, 541; 29/25.03

(56) References Cited

U.S. PATENT DOCUMENTS

| | | | | |
|---|---|---|---|---|
| 4,539,623 A | * | 9/1985 | Irikura et al. | 361/540 |
| 5,007,149 A | * | 4/1991 | Schnabel | 29/25.03 |
| 5,268,822 A | * | 12/1993 | Delalande et al. | 361/529 |

FOREIGN PATENT DOCUMENTS

| EP | 0 200 670 A2 | * | 5/1986 |
|---|---|---|---|
| JP | 9-298256 A | | 11/1997 |

* cited by examiner

*Primary Examiner*—Anthony Dinkins
(74) *Attorney, Agent, or Firm*—Frishauf, Holtz, Goodman & Chick, P.C.

(57) ABSTRACT

In a chip-type solid electrolytic capacitor including a capacitor element, anode terminal and cathode terminal are electrically connected to the capacitor element. A casing resin covers the capacitor element and the anode and cathode terminals. Each of the anode and cathode terminals has a bottom mount surface to be mounted on a circuit board and an exposed surface substantially perpendicular to the bottom mount surface and exposed at a side surface of the casing resin. Each of the exposed surfaces is subjected to plating to have a plated portion.

16 Claims, 12 Drawing Sheets

CHIP-TYPE SOLID ELECTROLYTIC CAPACITOR SUPERIOR IN PRODUCTIVITY AND RELIABILITY THEREOF

This application claims priority to prior Japanese patent application JP 2003-270914, the disclosure of which is incorporated herein by reference.

BACKGROUND OF THE INVENTION

This invention relates to a chip-type solid electrolytic capacitor, a lead frame used in producing the chip-type solid electrolytic capacitor, and a method of producing the chip-type solid electrolytic capacitor.

Solid electrolytic capacitors using tantalum, niobium, or the like as a valve-action metal are small in size, large in capacitance, and excellent in frequency characteristic and have thus been widely used in power circuits of CPUs and so forth. Following the recent development of portable electronic devices, reduction in size and thickness of particularly chip-type solid electrolytic capacitors has been progressed.

Such a chip-type solid electrolytic capacitor is of the surface-mount type and comprises anode and cathode terminals each having a bottom mount surface to be mounted on a circuit board and a side surface exposed on the side of the capacitor. When mounting the capacitor on the circuit board by soldering, not only the bottom mount surfaces of the terminals but also the exposed side surfaces of the terminals are quite important. The reason is that solder fillets formed on the exposed side surfaces of the terminals is observed after the soldering to thereby examine the state of the soldering at the bottom mount surfaces of the terminals. If the solder fillets are not uniformly formed on both exposed side surfaces of the terminals, the capacitor is obliquely mounted on the circuit board. Further, if the volume of the solder fillets formed on the exposed side surfaces is not sufficient, the solder excessively stays at the bottom of the capacitor, i.e. between the bottom mount surfaces of the terminals and the circuit board, so that the capacitor is forced upward away from the circuit board.

In view of this, in order to improve the formation of the solder fillets on the exposed side surfaces of the terminals, plating is applied to the exposed side surfaces thereof. This technique is described in, for example, Japanese Patent Application Publication (JP-A) No. H09-298256.

However, in the conventional technique, the plating is applied to the terminals after the capacitor has been assembled, which causes the following problems.

As a plating technique for assembled electronic components including the foregoing chip-type solid electrolytic capacitor, barrel plating is generally employed. In the barrel plating, however, orientations of the products after the plating become random so that alignment of the products is required in vertical, longitudinal, lateral, and polarity directions. This necessitates introduction of costly equipment such as a product aligning device to cause an increase in production cost. Further, this also results in longer production time. Moreover, a plating liquid may enter the inside of the products during the plating to cause deterioration in property of the products.

SUMMARY OF THE INVENTION

It is therefore a general object of this invention to provide a chip-type solid electrolytic capacitor, which can solve the foregoing problems inherent in the conventional technique.

It is an object of this invention to provide a chip-type solid electrolytic capacitor, which is superior in productively and reliability thereof.

It is another object of this invention to provide a lead frame used in producing the chip-type solid electrolytic capacitor.

It is still another object of this invention to provide a method of producing the chip-type solid electrolytic capacitor.

Other objects of this invention will become clear as the description proceeds.

According to one aspect of this invention, there is provided a chip-type solid electrolytic capacitor comprising a capacitor element, an anode terminal and a cathode terminal electrically connected to said capacitor element, and a casing resin covering said capacitor element and said anode and cathode terminals, each of said anode and cathode terminals having a bottom mount surface to be mounted on a circuit board and an exposed surface substantially perpendicular to said bottom mount surface and exposed at a side surface of said casing resin, each of said exposed surfaces being subjected to plating to have a plated portion.

According to another aspect of this invention, there is provided a lead frame for producing a chip-type solid electrolytic capacitor, comprising an anode terminal serving portion and a cathode terminal serving portion, wherein each of the anode and cathode terminal serving portions comprises a window having a plated side and a cover closing the window.

According to still another aspect of this invention, there is provided a method of producing a chip-type solid electrolytic capacitor, comprising the steps of preparing a lead frame having a window and a cover closing the window, the window having a straight side that has been subjected to plating; joining a capacitor element to the lead frame; covering the capacitor element and the lead frame with a casing resin; and cutting the casing resin and the lead frame along the plated straight side of the window so that the plated straight side is exposed at a side surface of the casing resin.

According to yet another aspect of this invention, there is provided a method of producing a chip-type solid electrolytic capacitor, comprising the steps of preparing a lead frame having an anode terminal serving portion and a cathode terminal serving portion, each of the anode and cathode terminal serving portions having a window and a cover closing the window, the window having a straight side that has been subjected to plating; joining a capacitor element to the anode and cathode terminal serving portions; covering the capacitor element and the anode and cathode terminal serving portions with a casing resin; and cutting the casing resin and the anode and cathode terminal serving portions along each of the plated straight sides of the windows so that the plated straight sides are exposed at side surfaces of the casing resin.

DESCRIPTION OF THE PREFERRED EMBODIMENT

For facilitating better understanding of this invention, the conventional technique for producing a chip-type solid electrolytic capacitor will first be described with reference to FIGS. 1 to 3.

Figure 1:
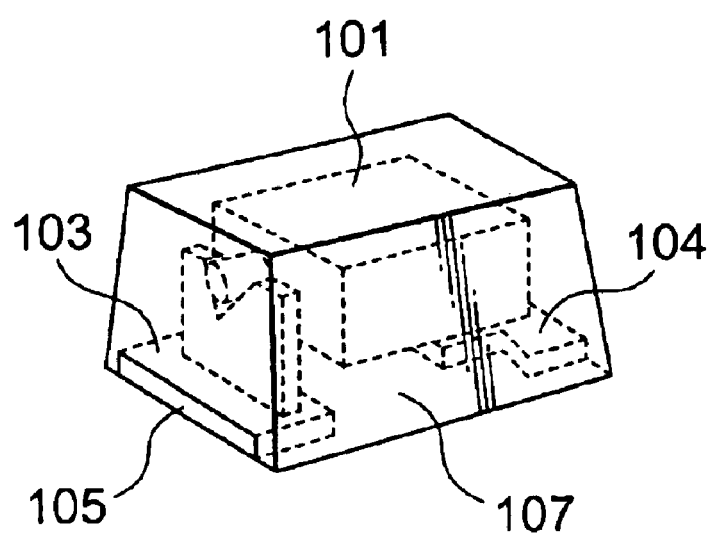
FIG. 1 is a perspective view of a conventional chip-type solid electrolytic capacitor.

The conventional chip-type solid electrolytic capacitor illustrated in FIG. 1 is of the surface-mount type having a so-called bottom-electrode structure. The bottom-electrode structure is suitable for reducing the size and weight of a chip-type solid electrolytic capacitor, wherein bottom surfaces of a lead frame are used as bottom mount surfaces of anode and cathode terminals, respectively.

In FIG. 1, the capacitor comprises a capacitor element 101, an anode terminal 103, a cathode terminal 104, and a casing resin 107. As appreciated, FIG. 1 illustrates the capacitor in a see-through manner assuming that the casing resin 107 is transparent. Numeral 105 denotes a side surface of the anode terminal 103. The side surface 105 of the anode terminal 103 is exposed at a side surface of the casing resin 107 and has been subjected to plating after assembling of the capacitor. Although not illustrated, the cathode terminal 104 also has a side surface exposed at the opposite side surface of the casing resin 107 and having been subjected to plating after assembling of the capacitor.

Figure 2:
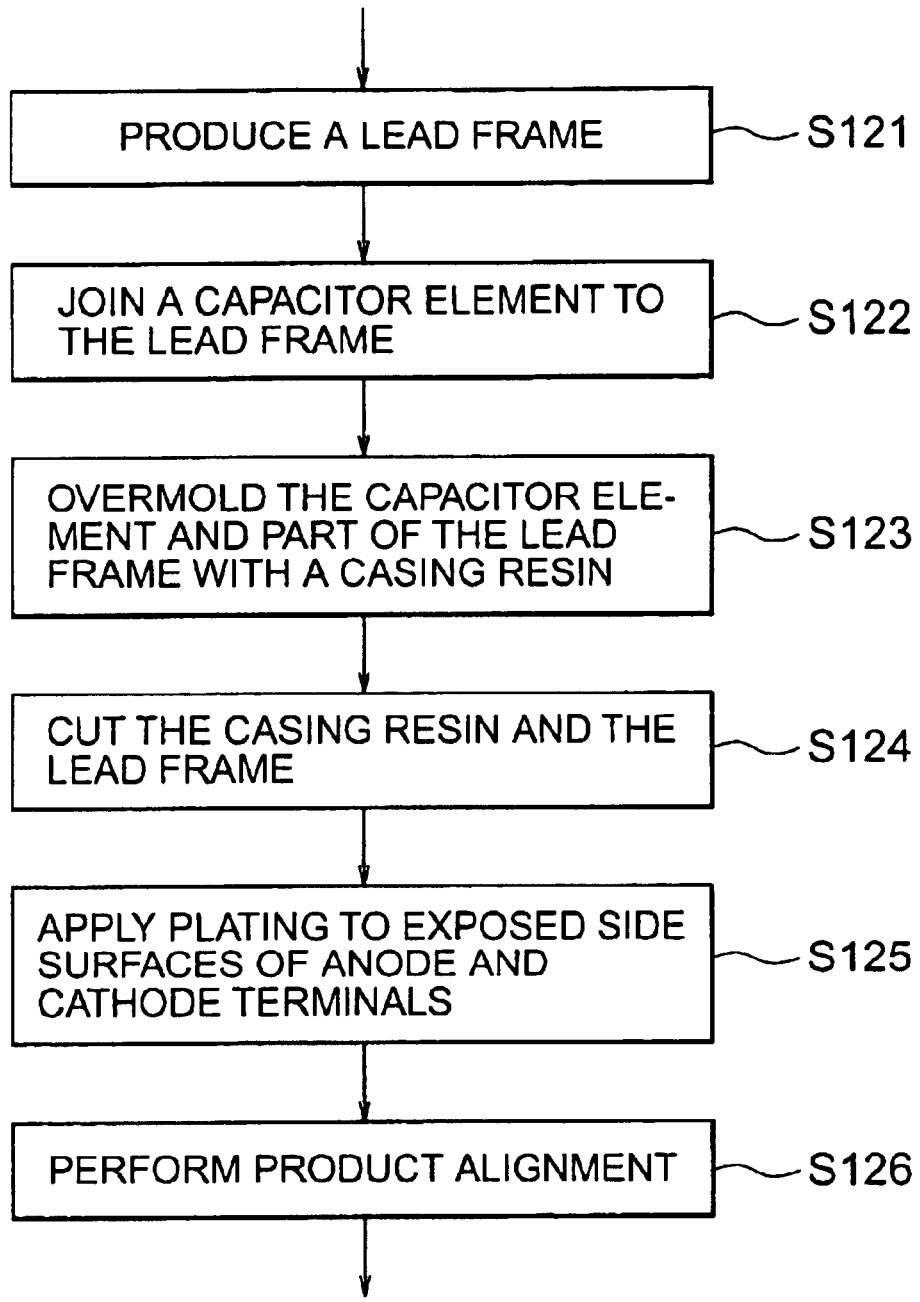
FIG. 2 is a process flow diagram showing a method of producing the capacitor of FIG. 1.
Figure 3:
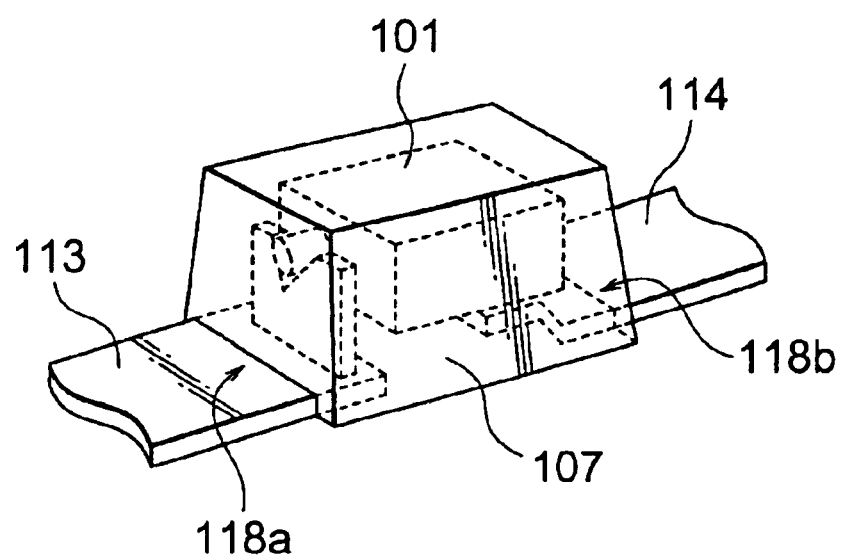
FIG. 3 is a perspective view for describing the method shown in FIG. 2, wherein anode and cathode terminals of the chip-type solid electrolytic capacitor shown in FIG. 1 are not yet cut off from the remainder of a lead frame.

FIG. 2 is a process flow diagram showing the conventional method of producing the chip-type solid electrolytic capacitor shown in FIG. 1.

In FIG. 2, a lead frame is produced in step S121. The lead frame comprises anode terminal serving portions and cathode terminal serving portions that are formed in pairs in a confronting manner. Then, in step S122, the capacitor element 101 produced in advance is fixedly joined to the lead frame. Specifically, as illustrated in FIG. 3, the anode terminal serving portion 113 and the cathode terminal serving portion 114 in each pair of the lead frame are bent upward at their confronting ends, and the capacitor element 101 is fixedly joined thereto. Although the single pair of anode and cathode terminal serving portions 113 and 114 and the single capacitor element 101 are illustrated in the figure, a number of capacitors are produced simultaneously as is well known in the art. For simplification, however, description will be given about the production of only one capacitor. Then, in step S123, the capacitor element 101 and part of each of the anode and cathode terminal serving portions 113 and 114 are overmolded with the casing resin 107 as shown in FIG. 3. Then, in step S124, the casing resin 107 and the anode and cathode terminal serving portions 113 and 114 are cut along planes 118a and 118b as shown in FIG. 3, so that the side surfaces of the anode and cathode terminals 103 and 104 are exposed at the opposite side surfaces of the casing resin 107. Thereafter, in step S125, plating is applied to exposed side surfaces of the anode and cathode terminals 103 and 104 so that the capacitor shown in FIG. 1 is obtained as the product. Then, in step S126, the obtained products having random orientations due to the plating are aligned by the use of a suitable aligning device.

This conventional production method has the drawbacks as pointed out in the introductory part of the specification.

Now, a preferred embodiment of the present invention will be described with reference to FIGS. 4 to 11.

Figure 4:
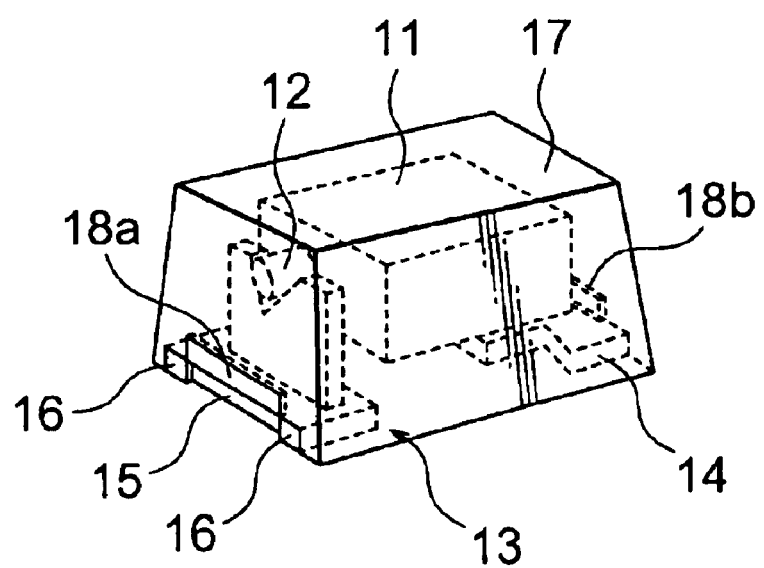
FIG. 4 is a perspective view of a chip-type solid electrolytic capacitor according to a preferred embodiment of the present invention.

FIG. 4 is a perspective view of a chip-type solid electrolytic capacitor according to the preferred embodiment of the present invention. The illustrated capacitor is of the surface-mount type having the bottom-electrode structure.

In FIG. 4, the capacitor comprises a capacitor element 11, an anode lead 12, an anode terminal 13, a cathode terminal 14, and a casing resin 17. As appreciated, FIG. 4 illustrates the capacitor in a see-through manner assuming that the casing resin 17 is transparent. The anode terminal 13 has a side surface exposed as an exposed surface or the exposed side surface at a side surface of the casing resin 17. The exposed side surface comprises a first portion 15 having been subjected to plating and a pair of second portions 16 and 16 not having been subjected to plating. The first portion 15 is referred to as a plated portion. The second portions 16 and 16 will be referred to as non-plated portions.

Further, a cover strip 18a is fixedly disposed adjacent to the first surface 15 of the anode terminal 13 on the upper side thereof. Although not illustrated, the cathode terminal 14 also has a side surface having the same structure as that of the exposed side surface of the anode terminal 13. Further, like the cover strip 18a, a cover strip 18b is fixedly disposed adjacent to the first portion of the cathode terminal 14 on the upper side thereof.

Figure 5:
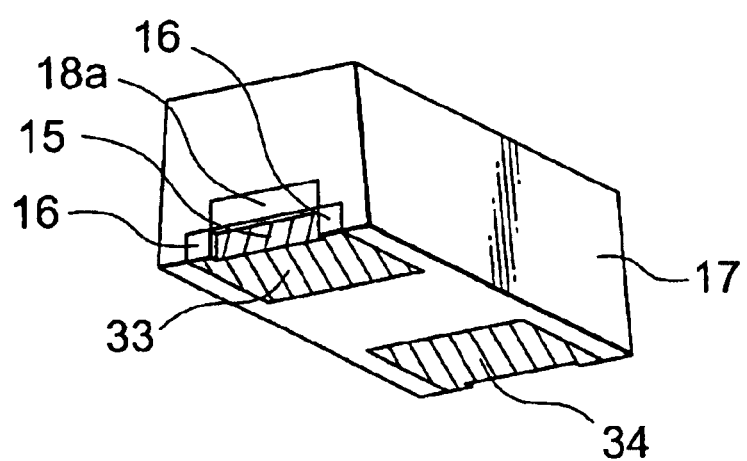
FIG. 5 is a perspective view, as seen from below, of the capacitor shown in FIG. 4.

FIG. 5 is a perspective view, as seen from below, of the capacitor illustrated in FIG. 4. As depicted by hatching in the figure, bottom mount surfaces 33 and 34 of the anode and cathode terminals 13 and 14 to be mounted on a circuit board have also been subjected to plating besides the first portions of the exposed side surfaces of the anode and cathode terminals 13 and 14. With this structure, the capacitor can be held stable in posture when it is mounted to the circuit board.

Figure 6:
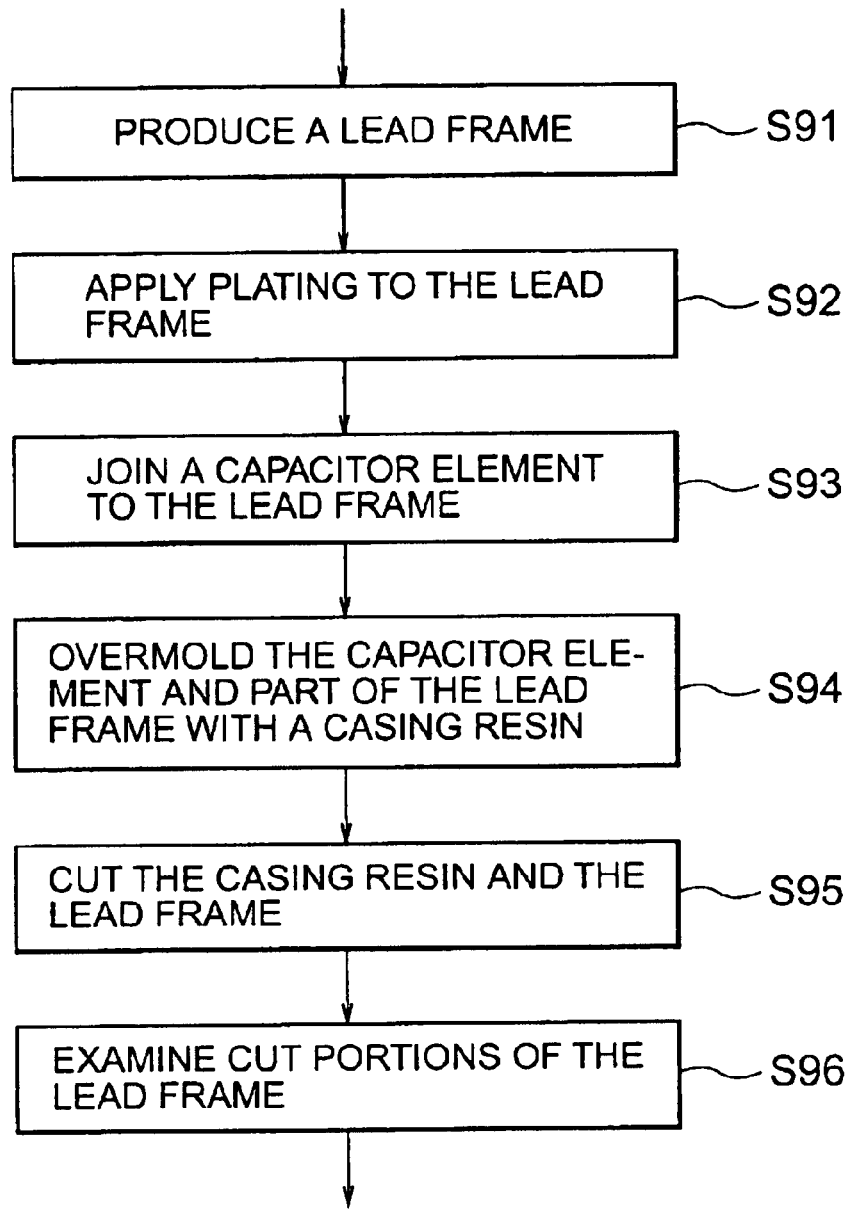
FIG. 6 is a process flow diagram showing a method of producing the capacitor of FIG. 4.

FIG. 6 is a process flow diagram showing a method of producing the capacitor illustrated in FIG. 4.

Figure 7:
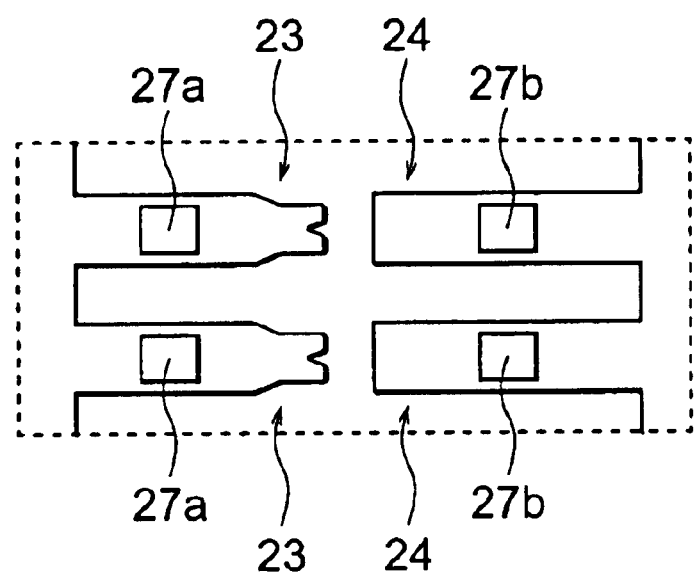
FIG. 7 is a plan view of a lead frame for use in producing the capacitor of FIG. 4.

In FIG. 6, a lead frame is produced in step S91. Specifically, as shown in FIG. 7, a lead frame initially has a plate-like shape and comprises anode terminal serving portions 23 and cathode terminal serving portions 24 that are formed in pairs in a confronting manner. Then, each of the anode terminal serving portions 23 and each of the cathode terminal serving portions 24 are formed with processed portions 27a and 27b, respectively. In this embodiment, the lead frame is made of an alloy 42 (namely, an alloy of 42% Ni and 58% Fe).

For simplification, description will be given hereinbelow about only one pair of the anode terminal serving portion 23 and the cathode terminal serving portion 24.

Figure 8:
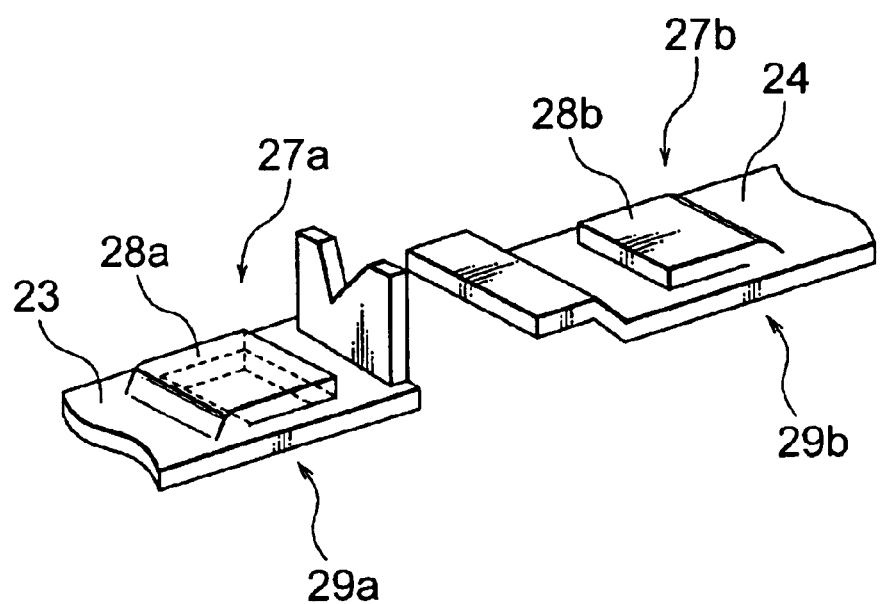
FIG. 8 is a perspective view of anode and cathode terminal serving portions of the lead frame.

As illustrated in FIG. 8, the processed portion 27a comprises a rectangular cover 28a and a rectangular window 29a closed by the cover 28a. Likewise, the processed portion 27b comprises a rectangular cover 28b and a rectangular window 29b closed by the cover 28b. The cover 28a and the window 29a are formed by a blanking-bending process using a metal die. Specifically, a rectangular portion of the anode terminal serving portion 23 of the lead frame is blanked at three sides thereof and simultaneously pushed and bent outward at the remaining side thereof so that the rectangular portion is forcibly moved by a distance equal to a thickness of the lead frame. By this movement, the cover 28a is formed by the rectangular portion, and the window 29a having a corresponding space is simultaneously formed. Accordingly, the window 29a has three cut sides or surfaces and one bent side or surface.

Figure 9A:
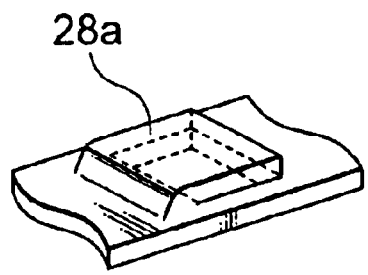
FIG. 9A is a perspective view of a processed portion, having a cover and a window, of the anode terminal serving portion.
Figure 9B:
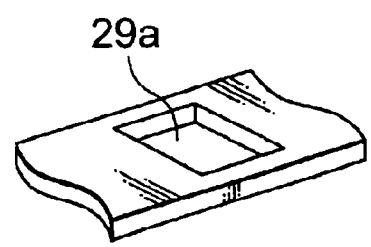
FIG. 9B is a perspective view of the processed portion with the cover being omitted.

Then, in step S92, plating is applied to the three cut sides of the window 29a as identified by hatching in FIGS. 9A and 9B. Simultaneously, plating is also applied to a portion of the anode terminal serving portion 23 that will serve as the bottom mount surface 33 (see FIG. 5) of the anode terminal 13. As appreciated, FIG. 9B illustrates the window 29a with the cover 28a being omitted for better understanding of the state of the window 29a.

Note that the cover 28b and the window 29b of the cathode terminal serving portion 24 are formed in the same manner as the cover 28a and the window 29a of the anode terminal serving portion 23. Further, like the plating to the anode terminal serving portion 23, plating is applied to a portion of the cathode terminal serving portion 24 that will serve as the bottom mount surface 34 (see FIG. 5) of the cathode terminal 14, simultaneously with the application of plating to three cut sides of the window 29b.

In the window 29a, plating may be applied to only one of the three cut sides that will serve as the first portion 15 (see FIG. 4) of the anode terminal 13. This also applies to the cathode terminal 14.

Figure 9C:
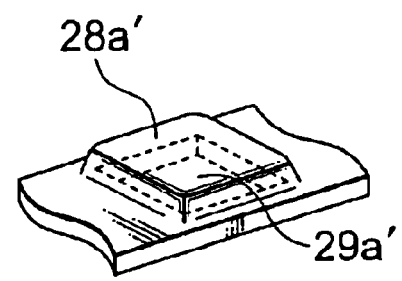
FIG. 9C is a perspective view showing a modification of the processed portion shown in FIG. 9A.

On the other hand, as shown in FIG. 9C, a rectangular portion of the anode terminal serving portion 23 of the lead frame may be blanked only at one side thereof and simultaneously pushed and bent outward at the remaining three sides thereof to form a cover 28a' and a window 29a'. In this case, the window 29a' has one cut side and three bent sides and plating is applied to only such one cut side. As appreciated, this also applies to the cathode terminal serving portion 24.

Figure 10A:
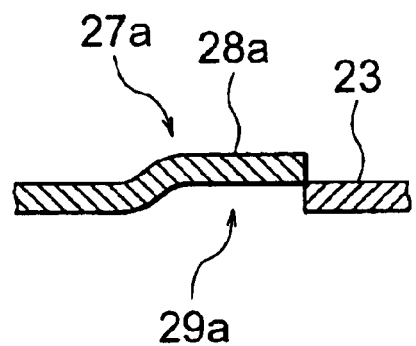
FIG. 10A is a sectional view for describing a shape of the cover of the processed portion shown in FIG. 9A.
Figure 10B:
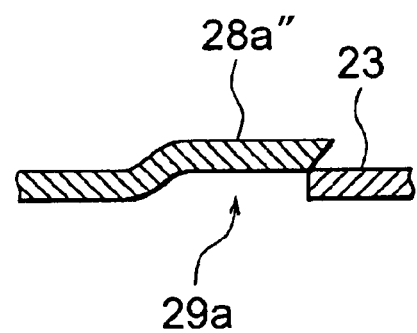
FIG. 10B is a sectional view showing a modification of the cover of the processed portion shown in FIG. 10A.

FIG. 10A is a sectional view of the processed portion 27a of the anode terminal serving portion 23. As illustrated in the figure, a side of the cover 28a corresponding to the side of the window 29a that will serve as the first portion 15 of the anode terminal 13 forms a right angle relative to the surface of a portion of the anode terminal serving portion 23 that will serve as the anode terminal 13. This also applies to the cover 28b. On the other hand, as shown in FIG. 10B, a side of a cover 28a" may be subjected to a drawing process so as to form an acute angle relative to the surface of such a portion of the anode terminal serving portion 23. This may also apply to the cover 28a' shown in FIG. 9C.

Referring back to FIG. 8, after the formation of the covers 28a and 28b and the windows 29a and 29b, mutually confronting end portions of the anode and cathode terminal serving portions 23 and 24 are bent upward to form joining portions that will be joined to the anode lead 12 and a cathode layer of the capacitor element 11.

Figure 11:
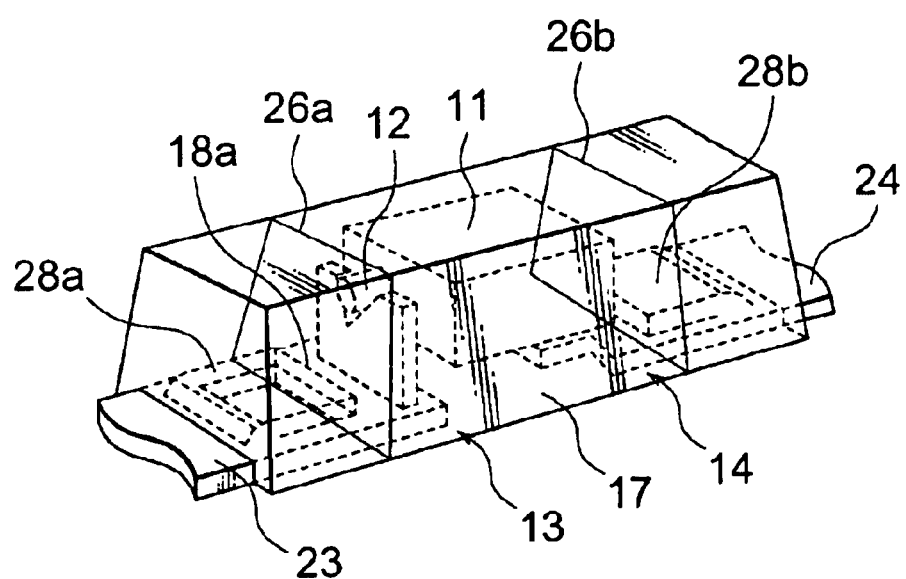
FIG. 11 is a perspective view for describing the method shown in FIG. 6, wherein anode and cathode terminals of the capacitor shown in FIG. 4 are not yet cut off from the remainder of the lead frame.

Then, in step S93, the capacitor element 11 produced in advance is fixedly joined to the lead frame. Specifically, as illustrated in FIG. 11, the anode lead 12 and the cathode layer of the capacitor element 11 are fixedly joined to the joining portions of the anode and cathode terminal serving portions 23 and 24, respectively. In this embodiment, the anode lead 12 is joined to the joining portion by laser welding, while the cathode layer is joined to the joining portion by a conductive adhesive. Although the single pair of anode and cathode terminal serving portions 23 and 24 and the single capacitor element 11 are illustrated in the figure, a number of capacitors are produced simultaneously as is well known in the art. For simplification, however, description will be given about the production of only one capacitor.

The capacitor element 11 is produced by a known technique. For example, tantalum is used as a valve-action metal. First, tantalum metal powder is formed into a compact by pressing while a tantalum lead wire is embedded in the compact. The compact is then sintered in a high vacuum at a high temperature. Then, a $Ta_2O_5$ film is formed on the surface of the sintered compact. After immersed in a manganese nitrate solution, the compact with the $Ta_2O_5$ film is subjected to thermal decomposition to form $MnO_2$. Subsequently, a cathode layer is formed by graphite and silver to obtain a capacitor element. If use is made of a conductive high polymer such as polythiophene or polypyrrole instead of $MnO_2$, a low ESR can be easily achieved. Further, use may be made of niobium, aluminum, titanium, or the like as a valve-action metal instead of tantalum.

Then, in step S94, the capacitor element 11 and part of each of the anode and cathode terminal serving portions 23 and 24 are overmolded with the casing resin 17 as shown in FIG. 11 by transfer molding. In this event, the covers 28a and 28b of the anode and cathode terminal serving portions 23 and 24 serve to prevent the casing resin 17 from entering the windows 29a and 29b, respectively, to thereby protect the cut side of the window 29a and the cut side of the window 29b that will serve as the first portion 15 (see FIG. 4) of the anode terminal 13 and the first portion of the cathode terminal 14, respectively.

Then, in step S95, the casing resin 17 and the anode and cathode terminal serving portions 23 and 24 are cut along planes 26a and 26b as shown in FIG. 11 by the use of a dicing saw. As a result, the anode and cathode terminals 13 and 14 are cut off from the remainder of the anode and cathode terminal serving portions 23 and 24, respectively, and the capacitor illustrated in FIG. 4 is obtained. In this event, end portions of the covers 28a and 28b adjacent to the first portions of the anode and cathode terminals 13 and 14 are cut off from the remainder of the covers 28a and 28b to form the cover strips 18a and 18b, respectively, as shown in FIG. 4.

Finally, in step S96, cut portions of the anode and cathode terminals 13 and 14 are examined to check whether the first portions of the anode and cathode terminals 13 and 14 are suitably formed. This check can be achieved by confirming the presence of the cover strips 18a and 18b, respectively. As appreciated, if each of the cover strips 18a and 18b remains, the corresponding first portion is judged to be suitably formed. In view of this, if the side of the cover has the shape as shown in FIG. 10B, the cover strip can be fixed to the casing resin 17 more firmly.

Figure 12A:
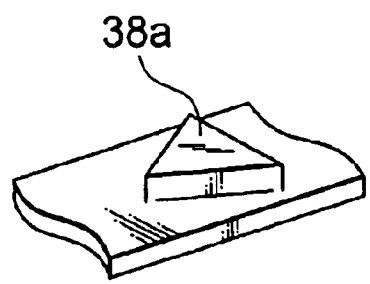
FIGS. 12A to 12C are perspective views showing modifications of the processed portion shown in FIG. 9A, respectively.

FIG. 12A shows a modification of the processed portion 27a of the anode terminal serving portion 23. Specifically, in this modification, the processed portion comprises a cover 38a having a triangular shape and a window having the corresponding triangular shape. The window has one cut side and two bent sides. Plating is applied to the cut side of the window that will serve as the first portion 15 of the anode terminal 13. This also applies to the processed portion 27b of the cathode terminal serving portion 24.

Figure 12B:
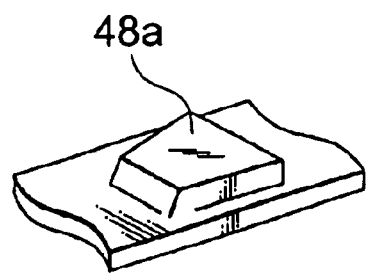

FIG. 12B shows another modification of the processed portion 27a of the anode terminal serving portion 23. Specifically, in this modification, the processed portion comprises a cover 48a having a trapezoidal shape and a window having the corresponding trapezoidal shape. The window has three cut sides and one bent side. Plating is applied to the three cut sides of the window or only one of the three cut sides that will serve as the first portion 15 of the anode terminal 13. On the other hand, the window may have only one cut side and three bent sides. Note that it is sufficient for the window to have at least one cut side. This also applies to the processed portion 27b of the cathode terminal serving portion 24.

Figure 12C:
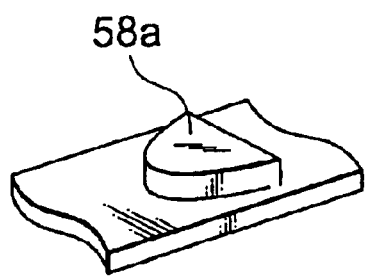

FIG. 12C shows another modification of the processed portion 27a of the anode terminal serving portion 23. Specifically, in this modification, the processed portion comprises a cover 58a having a generally semicircular or semioval shape and a window having the corresponding shape. The window has one cut side at a straight portion, and an arc portion is bent. Plating is applied to the cut side of the window that will serve as the first portion 15 of the anode terminal 13. This also applies to the processed portion 27b of the cathode terminal serving portion 24.

The shape of the side of the cover illustrated in FIG. 10B may also apply to the foregoing modifications.

It is to be noted that the shape of the processed portions of the anode and cathode terminal serving portions 23 and 24 may be suitably selected depending on the elastic and plastic properties of the alloy of the lead frame, the thickness of the lead frame, the required dimensions of the first portions of the anode and cathode terminals 13 and 14, and so forth.

While the present invention has thus far been described in conjunction with the preferred embodiment and modifications thereof, it will be readily possible for those skilled in the art to put this invention into practice in various other manners without departing from the scope of this invention. For example, in the foregoing preferred embodiment and modifications thereof, the cover of each processed portion is integral with the lead frame. However, the cover may be fully blanked out from the lead frame, and the casing resin may be overmolded after closing the window by a plate-like cover larger than the window. Still in this case, it is defined that the plate-like cover forms part of the lead frame. This structure can also effectively prevent the casing resin from entering the window. In this case, a material of the cover may be selected from a variety of materials including metals, alloys, high polymers, and so forth.

What is claimed is:

1. A chip-type solid electrolytic capacitor comprising:
    a capacitor element;
    an anode terminal and a cathode terminal electrically connected to said capacitor element; and
    a casing resin covering said capacitor element and said anode and cathode terminals,
    each of said anode and cathode terminals having a bottom mount surface to be mounted on a circuit board and an exposed surface substantially perpendicular to said bottom mount surface and exposed at a side surface of said casing resin,
    each of said exposed surfaces being subjected to plating to have a plated portion.

2. The chip-type solid electrolytic capacitor according to claim 1, wherein each of said exposed surfaces further comprises a pair of non-plated portions at opposite ends of said plated portion.

3. The chip-type solid electrolytic capacitor according to claim 2, wherein a strip-like member is disposed adjacent to each of said plated portions on a side thereof apart from said bottom mount surface, said strip-like member separating said plated portion and said casing resin from each other.

4. A lead frame for producing a chip-type solid electrolytic capacitor, comprising an anode terminal serving portion and a cathode terminal serving portion, wherein each of said anode and cathode terminal serving portions comprises a window having a plated side and a cover closing said window.

5. The lead frame according to claim 4, wherein said plated side of the window is formed by blanking a portion of each of said anode and cathode terminal serving portions along a predetermined straight line to form a straight side of said window and applying plating to said straight side.

6. The lead frame according to claim 4, wherein each of said windows has a shape having at least one straight side corresponding to said plated side, and said at least one straight side is formed by blanking a portion of each of said anode and cathode terminal serving portions along at least one predetermined straight line.

7. The lead frame according to claim 4, wherein each of said windows has a polygonal shape, and a predetermined portion of each of said anode and cathode terminal serving portions is blanked along at least a first line by a thickness of said predetermined portion to form at least one side of said polygonal shape corresponding to said plated side and is bent along at least a second line by said thickness to form at least one remaining side of said polygonal shape, to thereby simultaneously form said window and said cover.

8. The lead frame according to claim 4, wherein a side of said cover corresponding to said plated side of each of said windows forms an acute angle relative to a surface, adjacent to said plated side, of each of said anode and cathode terminal serving portions.

9. A method of producing a chip-type solid electrolytic capacitor, comprising the steps of:
    preparing a lead frame having a window and a cover closing said window, said window having a straight side that has been subjected to plating;
    joining a capacitor element to said lead frame;
    covering said capacitor element and said lead frame with a casing resin; and
    cutting said casing resin and said lead frame along said plated straight side of the window so that said plated straight side is exposed at a side surface of said casing resin.

10. The method according to claim 9, further comprising the step of confirming presence of a part of said cover after the cutting step.

11. A method of producing a chip-type solid electrolytic capacitor, comprising the steps of:
    preparing a lead frame having an anode terminal serving portion and a cathode terminal serving portion, each of said anode and cathode terminal serving portions having a window and a cover closing said window, said window having a straight side that has been subjected to plating;

joining a capacitor element to said anode and cathode terminal serving portions;

covering said capacitor element and said anode and cathode terminal serving portions with a casing resin; and cutting said casing resin and said anode and cathode terminal serving portions along each of said plated straight sides of the windows so that said plated straight sides are exposed at side surfaces of said casing resin.

12. The method according to claim 11, wherein, in the step of cutting said casing resin and said anode and cathode terminal serving portions, part of each of said covers adjacent to said plated straight sides is cut off from the remainder of the cover so as to be fixed to said casing resin and exposed at the side surfaces of said casing resin.

13. The method according to claim 12, further comprising the step of confirming presence of said part of each of said covers after the step of cutting said casing resin and said anode and cathode terminal serving portions.

14. The method according to claim 11, wherein the step of preparing said lead frame comprises blanking a portion of each of said anode and cathode terminal serving portions along a predetermined straight line to form said straight side of said window that has not been subjected to plating.

15. The method according to claim 11, wherein the step of preparing said lead frame comprises blanking a predetermined portion of each of said anode and cathode terminal serving portions along at least a first line by a thickness of said predetermined portion to form at least said straight side of said window that has not been subjected to plating and bending said predetermined portion along at least a second line by said thickness to thereby simultaneously form said window and said cover.

16. A chip-type solid electrolytic capacitor produced by the method according to claim 11.

* * * * *